United States Patent [19]

Solhjell et al.

[11] Patent Number: 5,257,148
[45] Date of Patent: Oct. 26, 1993

[54] METHOD AND APPARATUS FOR POSITIONING A MAGNETIC HEAD IN A MAGNETIC LAYER MEMORY SYSTEM USING TRACKING BY READING A SPACED PAIR OF CORRESPONDING SUBTRACKS

[75] Inventors: Erik Solhjell; Nicolai W. Christie, both of Oslo, Norway

[73] Assignee: Tandberg Data AS, Norway

[21] Appl. No.: 924,615

[22] Filed: Aug. 6, 1992

Related U.S. Application Data

[63] Continuation of Ser. No. 527,436, May 23, 1990, abandoned.

[30] Foreign Application Priority Data

May 30, 1989 [EP] European Pat. Off. ........ 89109717.2

[51] Int. Cl.$^5$ .................... G11B 5/584; G11B 5/265
[52] U.S. Cl. .............. 360/77.06; 360/77.12; 360/121
[58] Field of Search ............ 360/77.06, 77.12, 121

[56] References Cited

U.S. PATENT DOCUMENTS

| | | | |
|---|---|---|---|
| 4,164,764 | 8/1979 | Joannou | 360/77 |
| 4,313,141 | 1/1982 | Yanagida et al. | 360/78 |
| 4,476,503 | 10/1984 | Solhjell | 360/75 |
| 4,525,750 | 6/1985 | Hamalainen | 358/327 |
| 4,556,920 | 12/1985 | Maeda et al. | 360/77.06 |
| 4,609,959 | 9/1986 | Rudi | 360/106 |
| 4,622,606 | 11/1986 | Rudi | 360/96.5 |
| 4,866,548 | 9/1989 | Rudi et al. | 360/77.02 |

FOREIGN PATENT DOCUMENTS

| | | | |
|---|---|---|---|
| 2627002 | 1/1977 | Fed. Rep. of Germany . | |
| 45-35155 | 11/1970 | Japan | 360/77.12 |
| 56-7229 | 1/1981 | Japan | 360/77.12 |
| 60107724 | 11/1983 | Japan . | |
| 6196576 | 10/1984 | Japan . | |
| 61258326 | 5/1985 | Japan . | |
| 60-107724 | 6/1985 | Japan | 360/77.12 |
| 61-96576 | 5/1986 | Japan | 360/77.12 |
| 6396716 | 10/1986 | Japan . | |
| 63155413 | 12/1986 | Japan . | |
| 63-155413 | 6/1988 | Japan | 360/77.12 |

OTHER PUBLICATIONS

Schwarz, T. A., "Re-Recordable Servo System for Multi-Track Tape", IBM Technical Disclosure Bulletin, vol. 25, No. 2, pp. 778-779, Jul. 1982.

Primary Examiner—David L. Robertson
Attorney, Agent, or Firm—Hill, Steadman & Simpson

[57] ABSTRACT

For the accurate positioning of a magnetic head to a track of a moving recording medium in a magnetic layer memory system, particularly a magnetic tape recorder, whereby a magnetic head is displaceable to different tracks in the transverse direction of the recording medium, signals are respectively recorded in tracks that are formed of two sub-tracks separate from one another by a narrow space. A write head that contains two write sub-heads separate from one another by a gap is provided for this purpose. The signals are read from the sub-tracks by two read sub-heads provided in a read head, whereby the respective read sub-heads are fashioned shorter in the transverse direction of the recording medium than the respective sub-tracks. Dependent on read signals of the two read sub-heads, the magnetic head is displaced in the transverse direction of the recording medium such that the magnetic head follows the track with optimum precision.

7 Claims, 2 Drawing Sheets

METHOD AND APPARATUS FOR POSITIONING A MAGNETIC HEAD IN A MAGNETIC LAYER MEMORY SYSTEM USING TRACKING BY READING A SPACED PAIR OF CORRESPONDING SUBTRACKS

This is a continuation of application Ser. No. 527,436, filed May 23, 1990 now abandoned.

BACKGROUND OF THE INVENTION

1. Field of the Invention

The present invention relates to a method and to an apparatus for accurate positioning of a magnetic head to at least one track of a moving recording medium in a magnetic layer memory, wherein the magnetic head is a combined magnetic head and includes at least one write head for recording signals on the recording medium and at least one read head for reading signals from the recording medium.

2. Description of the Prior Art

In a recording of signals, particularly data on a moving recording medium in a magnetic layer memory system, it is notoriously known in the art to employ a combined magnetic head that contains at least one write head and at least one read head. The storage system can be constructed, for example, as a magnetic tape recorder, as a magnetic disk memory, or as a diskette memory. The data are recorded on one or more tracks of the recording medium for example a magnetic tape, a magnetic disk or a diskette, with the write head and are read therefrom with the read head.

In a recording of data with a high packing or storage density in a plurality of parallel tracks, it is important, first of all, to increase the data set to be stored in the longitudinal direction of the tracks and, secondly, to increase the plurality of tracks on the recording medium. For this purpose, it is known to utilize a combined magnetic head having one or only a few write heads and one or only a few read heads and to then position the magnetic heads such that a write head and/or a read head comes to lie exactly on a respective desired track.

A method and an arrangement for the accurate positioning of a magnetic head to various tracks of a recording medium are disclosed, for example, in U.S. Pat. No. 4,866,548, fully incorporated herein by this reference. For positioning a magnetic head which is displaceable perpendicular to the running direction of the recording medium, a position value and, potentially, a correction value are calculated for each track in this known method, these values being supplied in common to a control device. The control device generates control signals therefrom for a positioning device for displacing the magnetic head. This known method leads to a drive of which the magnetic head position is dependent on the position values and on the appertaining correction values. A regulation of the positioning is not provided in this method.

The British Patent application 1 470 735 discloses an arrangement for regulating the track position of a magnetic head on a track of moving recording medium. In this known arrangement, a magneto-resistive read head that is fashioned wider than the track is provided in the magnetic head. The read head contains a center tap and a control signal for displacement of the magnetic head perpendicular to the moving direction of the recording medium is generated from the difference between the output signals of the two halves of the read head formed by the center tap. In this known arrangement, therefore, a magneto-resistive read head is required that is normally not available in standard magnetic heads.

SUMMARY OF THE INVENTION

An object of the present invention is to provide a method and an apparatus for accurate positioning of the magnetic head to a track of a moving recording medium wherein a magnetic head constructed in accordance with standard technology can be utilized and which nonetheless enables an extremely accurate regulation of the position of the magnetic head relative to a track with little expense.

The above object of the invention, with respect to a method and apparatus of the type initially set forth is achieved in a method which is particularly characterized in that the track is formed of two parallel sub-tracks upon which the signals are recorded on the recording medium by two write sub-heads provided in the write head and separate from one another by a gap, in that the signals are read from the sub-tracks by two read sub-heads provided in the read head, whereby the respective read sub-heads are constructed narrower in the transverse direction of the recording medium than the respective sub-tracks, and in that the combined magnetic head is displaced in the transverse direction of the recording medium dependent on read signals of the two sub-heads such that the combined magnetic head follows the track with optimum accuracy. The apparatus comprises a control device for the displacement of the magnetic head in the transverse direction and is particularly characterized in that the write head contains two write sub-heads that are arranged spaced in the transverse direction of the recording medium with a narrow space therebetween and that record the signals in a track formed of two sub-tracks on the recording medium, in that the read head allocated to a track contains two read sub-heads that are likewise arranged spaced in the transverse direction of the recording medium through the interposition of a gap therebetween, the read sub-heads being respectively constructed narrower in the transverse direction than the corresponding write sub-heads and read the signals from the sub-tracks, and in that the control device generates control signals for the displacement of the magnetic head in the transverse direction from the read signals of the two read sub-heads.

The method of the invention has the advantage that, as a consequence of the regulation, the position of the write head of the read head is dynamically adapted to all fluctuations of the track position and that all deviations from a reference position are dynamically compensated. The position need only be roughly prescribed and the fine adjustment is automatically undertaken.

For generating control signals for the displacement of the magnetic head perpendicular to the moving direction of the recording medium, the difference between the output signals of the two read sub-heads is formed. The output signals can be integrated before or after the formation of the difference for this purpose. It is also advantageous to rectify the output signals before or after the formation of the difference.

An arrangement for the implementation of the method contains a combined magnetic head comprising at least one write head for recording signals on the recording medium and at least one read head for reading the recorded data for the recording medium, and also contains a control device upon whose utilization the combined magnetic head is displaceable perpendicular to the moving direction of the recording medium. The write head comprises two write sub-heads that are arranged in a direction perpendicular to the moving direction of the recording medium upon formation of a narrow gap therebetween and that record the data into sub-tracks on the recording medium. The read head comprises two read sub-heads that are likewise arranged in the direction perpendicular to the moving direction of the recording medium upon formation of a narrow gap therebetween and that are constructed narrower in the perpendicular direction than the two write sub-heads. Using the output signals of the two read sub-heads, the control device generates control signals for the displacement of the magnetic head perpendicular to the moving direction of the recording medium.

The space between the write sub-heads can be of exactly the same size or larger than the space between the read sub-heads.

In the case of a combined magnetic head for a multi-track recording having more than one magnetic head system is provided in the arrangement, a read head positioned over a defined track can either be employed to record data on the same track with the write head assigned to this track or on a different track with a write head assigned to the different track. It is assured, due to the geometry of the multi-track head that the other track always has a constant spacing from the original track to which the read head is positioned.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
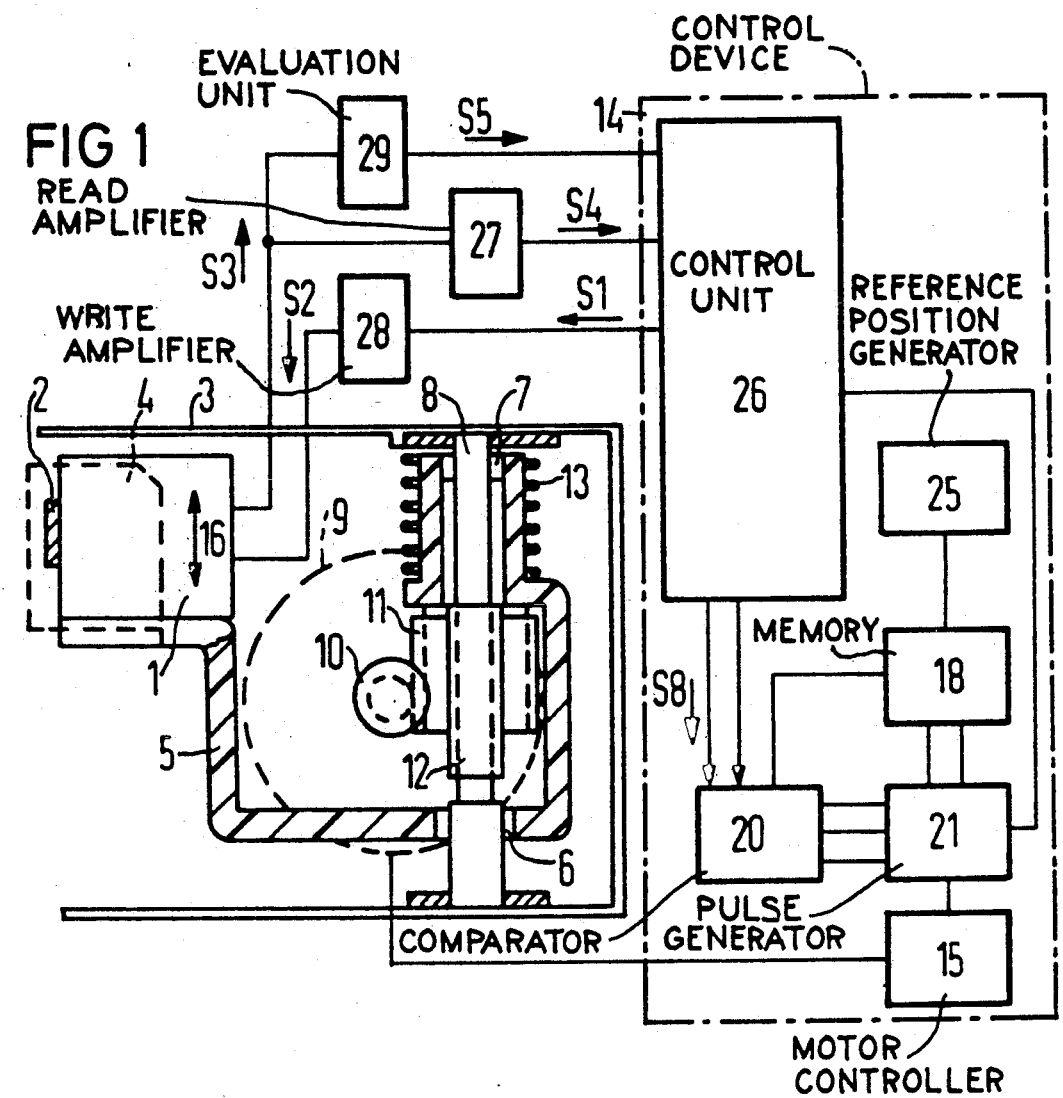
FIG. 1 is a schematic block diagram of a portion of a magneto-motive storage apparatus constructed as a magnetic tape recorder.

A magnetic tape recorder cassette device has been selected in FIG. 1 as an embodiment of a schematically-illustrated magnetic tape recorder device. Such a magnetic tape recorder device is disclosed, for example, in U.S. Pat. No. 4,622,606 and U.S. Pat. No. 4,609,959, both fully incorporated herein by this reference, and shall therefore be set forth here only in a summary fashion. A drive arrangement (not shown) for a magnetic tape 2 serving as a recording medium and a positioning arrangement for a combined magnetic head 1 are arranged in a housing 3 of the magnetic tape recorder device. A magnetic tape cassette 4 (shown with broken lines) and having the magnetic tape 2 can be introduced into the magnetic tape recorder device. During operation of the magnetic tape recorder device, the combined magnetic head 1 engages through an opening of the magnetic tape cassette in order to come into contact with the magnetic tape 2. The combined magnetic head 1 is secured on a head carrier 5 and, for the purpose of positioning, is displaceable together with the head carrier 5 along an axis 8, here a shaft, in the transverse direction of the magnetic tape 2, i.e. perpendicular to the moving direction of the magnetic tape 2, as illustrated by a double-headed arrow 16, being displaceable in this manner upon utilization of two bearings 6 and 7.

The displacement of the combined magnetic head 1 occurs with an electric motor 9 that is preferably constructed as a stepping motor, but that can also be fashioned as a DC motor. A worm 10 that is in an interactive connection with a worm wheel 11 is secured to the shaft of the motor 9. The shaft 8 has an outer thread 12 in the region of the worm wheel 11, the outer thread 12 collaborating with an inner thread of the worm wheel 11. The electric motor 9 drives the worm wheel 11 via the worm 10 and moves the worm wheel 11 in the axial direction along the shaft 8. A compression spring 13 urges the carrier 5 against the worm wheel 11 so that the head carrier 5 follows the movement of the worm wheel 11 in the axial direction and therefore positions the combined magnetic head 1 to different tracks of the magnetic tape 2. The radial movement of the head carrier 5 is inhibited while it is moving in the axial direction. This makes it impossible for the head carrier 5 to turn together with the worm wheel 11. For the insertion or removal of the magnetic tape cassette 4, however, the combined magnetic head 1, in common with a carrier 5, however, is pivotal from this working position into an idle position.

A motor controller 15 that drives the motor 9 via control signals that, for example, are fashioned as stepping pulses when the motor 9 is a stepping motor, is provided in a control device 14. The motor controller 15 is driven by a pulse generator 21 that receives control signals when positioning a write head or a read head of the combined magnetic head 1 to a specific track of the magnetic tape 2 in order to displace the combined magnetic head 1 from a specific track as an actual position to a different track as a reference position. Such a positioning device is notoriously known in the art and may be derived, for example, from U.S. Pat. No. 4,313,141, fully incorporated herein by this reference.

A defined track to which the write head or the read head is to be positioned is communicated from a central control unit of the magnetic tape recorder device or, as in the example of FIG. 1, from a control unit 26 constructed as a microcomputer. The actual position in which the combined magnetic head 1 is respectively located is stored in a memory 18, but could likewise be stored in the microcomputer 26.

At the beginning of the operation of the magnetic tape recorder device, the combined magnetic head 1 is brought into a reference position that is calculated by a reference position generator 25. This reference position, for example, is an edge of the magnetic tape 2 that, for example, is identified by a method disclosed in U.S. Pat. No. 4,476,503 fully incorporated herein by this reference. The reference position, however, can also be a first, outer or middle track, for example, of a magnetic tape 2 or, as disclosed in U.S. Pat. No. 4,313,141, a defined position of the positioning device that is recognized with a light barrier. This reference position is then the first actual position upon initialization and is stored in the memory 18.

The control unit 26 contains an allocator that comprises the reference position value of a respective track for each of the tracks identified by a defined track number. The reference position value output by the allocator and the actual position value output by the memory 18 are supplied to a comparator 20 that calculates the deviation with respect to the amount and with respect to the direction from the difference between the reference and actual position values. It initiates the pulse generator 21 to output pulses for the stepping motor 9 to the motor controller 15 until the reference position value coincides with the actual position value. The combined magnetic head 1 is therefore positioned to the desired track upon operation of the motor 9. Simultaneously, the pulses are supplied to the memory 18 so that the memory 18 contains the new actual position. To this end, the memory 18 can contain an adder that respectively subtracts or adds the corresponding plurality of pulses from or to the new actual position. It can also be fashioned as a counter whose counter reading indicates the respective actual position and that is respectively counted up or down by the pulses output by the pulse generator 21.

As already mentioned, the motor 9 can also be a DC motor. A timing disk having a plurality of markings can then be arranged on the shaft of the DC motor for accurate positioning, the markings be read by opto-electronic elements. In this case, the pulse generator 21 outputs signals until a prescribed plurality of clock pulses have been read, this plurality corresponding to the difference between the reference and actual positions.

The control unit 26 also serves the purpose of always controlling the position of the combined magnetic head 1 such that a write head or a read head always comes to lie exactly on a desired track. To this end, it is also part of a control loop that always correspondingly drives the motor 9.

As already mentioned, the combined magnetic head 1 is brought into the reference position in the above-described manner at the beginning of operation of the magnetic tape recorder device. Proceeding from this reference position, the combined magnetic head 1 is brought into a position assigned to a first track and data are recorded on the magnetic tape 2 in this track.

Figure 2:
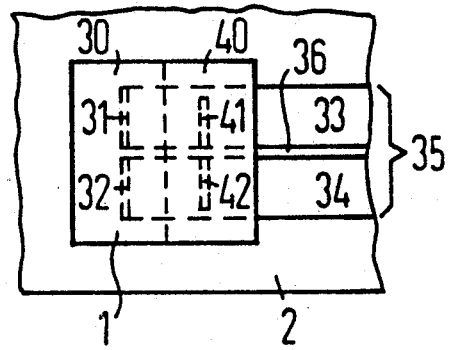
FIG. 2 is a schematic illustration of a recording of signals on a track of a recording medium.

As schematically illustrated in FIG. 2, the combined magnetic head 1 contains at least one write head 30 and at least one read head 40. The write head 30 is composed of two write sub-heads 31 and 32 that are arranged following one another in the transverse direction of the magnetic tape 2 and are separate from one another by a narrow space 36. When recording the data, the control unit 26 outputs write signals S1 and simultaneously supplies them via a write amplifier 28 to both write sub-heads 31 and 32. As a result thereof, the data are recorded in two sub-tracks 33 and 34 of a track 35 of the magnetic tape 2. The signal supplied to the two write sub-heads 31, 32 are preferably identical so that the data are recorded in the same manner. However, it is also possible to supply the two write heads 31, 32 with anti-phase signals. The two write sub-heads 31 and 32 are then preferably of the same size and have the same sensitivity.

When reading the data recorded in the sub-tracks 33 and 34, the read head 40 is positioned to the track 35, potentially after the magnetic tape 2 is rewound. The read head 40 contains two read sub-heads 41 and 42 that are likewise arranged following one another in the transverse direction of the magnetic tape 2 and that are likewise separated from one another by a space that can be the same as the space 36, but can also differ therefrom, being particularly smaller. The data are read from the sub-tracks 33 and 34 upon utilization of the read sub-heads 41 and 42 and read signals S3 are generated that are amplified in a read amplifier 27 and are output as amplified read signals S4 to the control unit 26 for further interpretation. The read sub-heads 41 and 42, however, also serve the purpose of accurately regulating the position of the read head 40 on the track 35. To this end, the read signals S3 are also supplied to an evaluation unit 29 that outputs the control signals S5 to the control unit 26. The position of the read head 40 is regulated with the control signals S5 such that it is positioned symmetrically relative to the space 36 over the sub-tracks 33 and 34.

Figure 3:
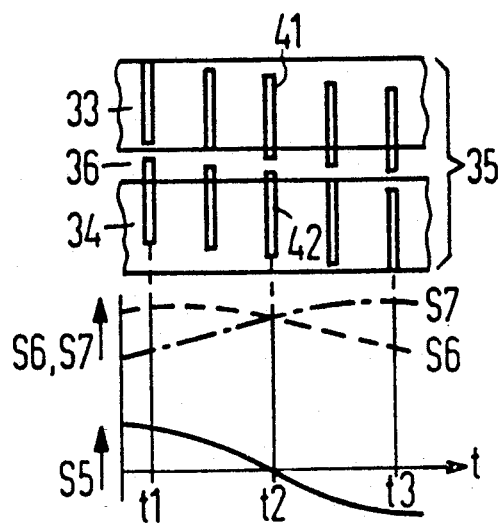
FIG. 3 is a schematic and graphic illustration of integrated output signals of read sub-heads given a displacement over sub-tracks.

FIG. 3 schematically explains the relationship between a displacement of the read head 40 transversely relative to the track direction and the output signals of the evaluation unit 29. The time t is illustrated along the abscissa and the integrated momentary values of rectified read signals S6 and S7 of the read signals S3 of the two read sub-heads 41 and 42 and the control signals S5 that are formed from the difference between the rectified read signals S6 and S7 after an integration are illustrated in the ordinate direction.

At a time t1, the read head 40 has been displaced too far in the upward direction and the integrated read signals S6 (broken line) of the read sub-head 41 are greater than those signals S7 (dot-dash line) of the read sub-head 42. The control signals S5 therefore have a positive value. At the time t2, the read head 40 is located exactly over the track 35, i.e. the read sub-heads 41 and 42 are arranged symmetrically relative to the space 36. The rectified read signals S6 and S7 cancel one another and the control signals S5 have the value 0. At the time t3, the read head 40 has been shifted in the downward direction and the rectified read signals S7 of the read sub-head 42 are greater than the rectified read signals S6 of the read sub-head 41, so that the control signals S5 have a negative value.

The control unit 26 generates regulation signals S8 from the control signals S5 and forwards the regulation signals S8 to the comparator 20 in order to displace the motor 9 such that the read head always comes to lie above the track 35 with an optimum accuracy, i.e. symmetrically relative to the space 36, assuming the position shown for the time t2.

Figure 4:
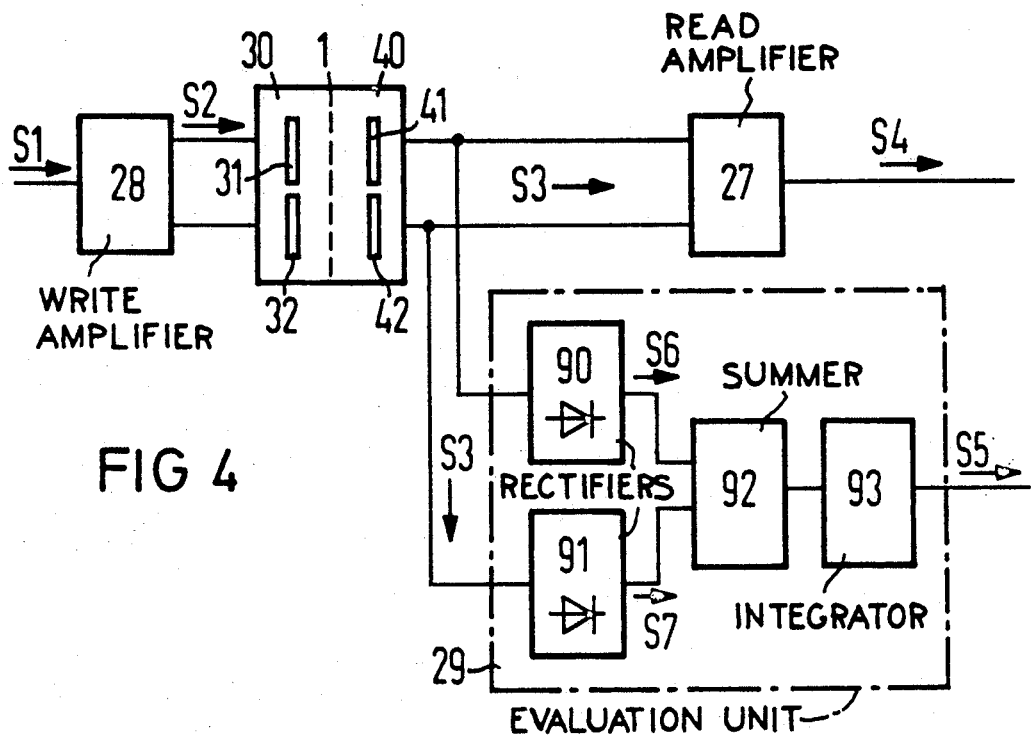
FIG. 4 is a schematic block circuit diagram of an arrangement for generating control signals.

FIG. 4 illustrates details of the evaluation unit 29 in order to explain the calculation of the control signals S5. When recording the data, the control unit 26 outputs the write signals S1 via the write amplifier 28 to the two write sub-heads 31 and 32 as amplified write signals S2 and the data are recorded on the magnetic tape 2. When reading the data from the magnetic tape 2, the two read sub-heads 41 and 42 output the read signals S3 that are fed to the control unit 26 as amplified read signals S4 via the read amplifier 27. To this end, the two read sub-heads 41 and 42 are connected in series. The read signals S3 are also supplied to the evaluation unit 29. The evaluation unit 29 contains two rectifiers 90 and 91 that rectify the read signals S3 of the respective read sub-heads 41 and 42 and output the rectified read signals S6 and S7. The rectified signals S6 and S7 are fed to a summing element 92 that generates the difference between the rectified signals S6 and S7, which feeds and is followed by a integrating element 93 that generates the control signals S5 that are output to the control unit 26.

The control unit 26 then generates the regulation signals S8 for the adjustment of the motor 9 so that the read sub-heads 41 and 42 come to lie above the sub-tracks 33 and 34 with optimum symmetry. It is also possible to follow each of the rectifiers 90 and 91 with a respective integrator. In this case, the rectified and read signals S6 and S7 employed in FIG. 3 are obtained. The integrator 93 is then not necessary.

Figure 5:
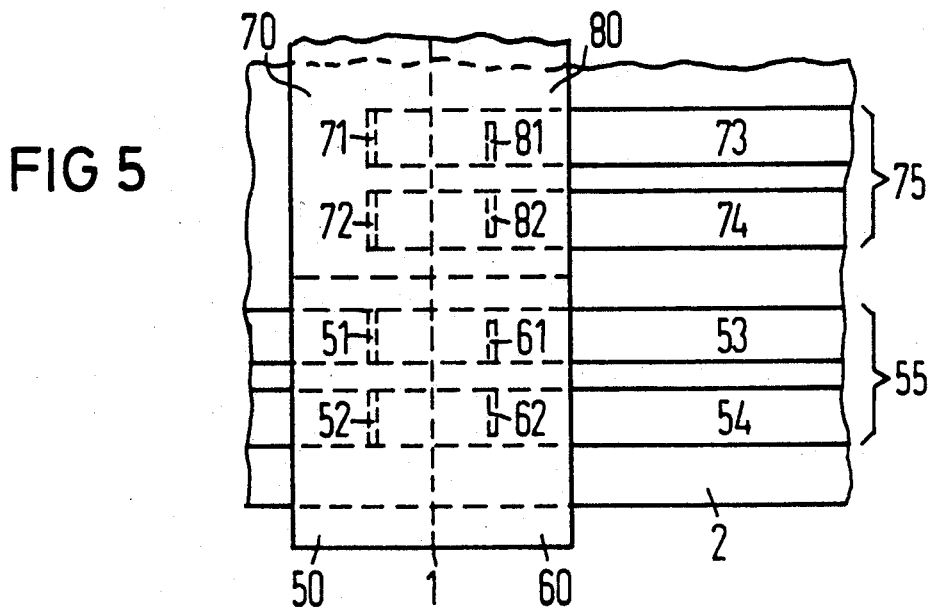
FIG. 5 is a schematic illustration of a recording of signals on a plurality of tracks of a recording medium.

As illustrated in FIG. 5, the arrangement of the present invention can also be employed to position a write head to a different track. To this end, a multi-track head 1 having two write heads 50 and 70 and two read heads 60 and 80 are provided. The write heads 50 and 70 each respectively contain write sub-heads 51 and 52 or, respectively, 71 and 72 and the read heads 60 and 80 each respectively contain read sub-heads 61 and 62 and, respectively, 81 and 82. It is assumed that a track 55 has already been recorded on the magnetic tape 2 and that a further track 75 is now to be recorded. In accordance with the above explanation directed to the illustration in FIG. 2, the read head 60 is positioned to the track 55. The read signals S3 are processed for generating the control signals S5 in order to regulate the position of the read head 60 over the track 55. Prescribed by the geometry of the multi-track head, the write head 70 then lies over the track 75. The new data in the sub-tracks 73 and 74 can then be simultaneously recorded on the track 75 with the write sub-heads 71 and 72 of the write head 70. It is assured in this manner that the track 75 always follows a prescribed distance from the track 55.

The distance between neighboring tracks can also be made extremely small and the recording density on the magnetic tape 2 can therefore be significantly increased. The distance between the write heads 50 and 70 or, respectively, between the read heads 60 and 80 can thereby be advantageously selected corresponding to twice the track spacing.

As is immediately apparent to one skilled in the art, events as set forth above in conjunction with the reading of the data with the read head 40 sequence when reading the data from the track 75 upon employment of the read head 80 having the read sub-heads 81 and 82, so that a further, detailed description thereof is superfluous.

Although we have described our invention by reference to particular illustrative embodiments thereof, many changes and modifications of the invention may become apparent to those skilled in the are without departing from the spirit and scope of the invention. We therefore intend to include within the patent warranted hereon all such changes and modifications as may reasonably and properly be included within the scope of our contribution to the art.

We claim:

1. A method for positioning a magnetic head with reference to a center of a recorded track and reading information from the recorded track, comprising the steps of:

providing the recorded track as two sub-tracks of equal width with a narrow space therebetween, each of the sub-tracks having a same information signal recorded thereon;

providing the magnetic head with a write head divided into two equal width sub-heads, a width of each of the sub-heads being the same as a width of each of the sub-tracks, and a gap between the two write sub-heads being the same as said narrow space, and also providing said same magnetic head with a read head formed of two sub-heads each of which have a width which is less than a width of each of said sub-tracks and said write sub-heads and which are spaced apart from one another at a gap therebetween which is less than said narrow space between said sub-tracks, said read sub-heads and said write sub-heads being aligned relative to one another such that the gaps between the sub-heads are in alignment over a center of said narrow space between the sub-tracks when the sub-heads are positioned over the sub-tracks;

reading the information signal on the sub-tracks by combining outputs from both of the read sub-heads and outputting said information signal based on the combined outputs; and when reading the information, centering a middle of the gap between the two read sub-heads above a center of said narrow space between the sub-tracks by comparing read signals from each of the read sub-heads and moving the head relative to the two sub-tracks until the read signals are equal, the read signal from one of the read sub-heads increasing and the read signal from the other read sub-head decreasing as soon as the center of the gap between the read sub-heads is displaced from the center of the narrow space between the sub-tracks.

2. A method according to claim 1 wherein an additional read head is provided spaced from the sub read heads and wherein the tape has an additional track for reading by said additional read head, and when the sub read heads are aligned over the sub-tracks, the additional read head is aligned by geometry of the magnetic head over the additional track.

3. A method for positioning a magnetic head with reference to a center of a recorded track and reading information from the recorded track, comprising the steps of:

providing the recorded track as two sub-tracks of equal width with a narrow space therebetween;

providing the magnetic head with a write head divided into two equal width sub-heads, a width of each of the sub-heads being the same as a width of each of the sub-tracks, and a gap between the two write sub-heads being the same as said narrow space, and also providing said same magnetic head with a read head formed of two sub-heads each of which have a width which is less than a width of each of said sub-tracks and said write sub-heads and which are spaced apart from one another at a gap therebetween which is less than said narrow space between said sub-tracks, said read sub-heads and said write sub-heads being aligned relative to one another such that the gaps between the sub-heads are in alignment over a center of said narrow space between the sub-tracks when the sub-heads are positioned over the sub-tracks; and when reading the information, centering a middle of the gap between the two read sub-heads above a center of said narrow space between the sub-tracks by comparing read signals from each of the read sub-heads and moving the head relative to the two sub-tracks until the read signals are equal, the read signal from one of the read sub-heads increasing and the read signal from the other read sub-head decreasing as soon as the center of the gap between the read sub-heads is displaced from the center of the narrow space between the sub-tracks.

4. A method according to claim 3 wherein an additional read head is provided spaced from the read sub-heads and wherein the tape has an additional track for reading by said additional read head, and when the read sub-heads are aligned over the sub-tracks, the additional read head is also aligned by geometry of the magnetic head over the additional track.

5. A method for positioning a magnetic head with reference to a center of a recorded track and reading information from the recorded track, comprising the steps of:

providing the recorded track as two subt5-racks of equal width with a narrow space therebetween, each of the sub-tracks having a same information recorded thereon;

providing the magnetic head with a write head divided into two equal width sub-heads, a width of each of the sub-heads being the same as a width of each of the sub-tracks, and a gap between the two write sub-heads being the same as said narrow space, and also providing said same magnetic head with a read head formed of two sub-heads each of which have a width which is less than a width of each of said sub-tracks and said write sub-heads and which are spaced apart from one another at a gap therebetween, said read sub-heads and said write sub-heads being aligned relative to one another such that the gaps between the sub-heads are in alignment over a center of said narrow space between the sub-tracks when the sub-heads are positioned over the sub-tracks;

reading the information signal on the sub-tracks by combining outputs from both of the read sub-heads and outputting said information signal based on the combined outputs; and when reading the information, centering a middle of the gap between the two read sub-heads above a center of said narrow space between the sub-tracks by comparing read signals from each of the read sub-heads and moving the head relative to the two sub-tracks until the read signals are equal, the read signal from one of the read sub-heads increasing and the read signal from the other read sub-head decreasing when the center of the gap between the read sub-heads is displaced from the center of the narrow space between the sub-tracks.

6. A method according to claim 5 wherein an additional read head is provided spaced from the read sub-heads and wherein the tape has an additional track for reading by said additional read head, and when the read sub-heads are aligned over the sub-tracks, the additional read head is also aligned by geometry of the magnetic head over the additional track.

7. A system for positioning a magnetic head with reference to a center of a recorded track and reading information from the recorded track, comprising:

the recorded track being provided as two sub-tracks of equal width with a narrow space therebetween, each of the sub-tracks having a same information signal recorded thereon;

the magnetic head having a write head divided into two equal width sub-heads, a width of each of the sub-heads being the same as a width of each of the sub-tracks, and a gap between the two write sub-heads being the same as said narrow space, and said same magnetic head also having a read head formed of two sub-heads each of which have a width which is less than a width of each of said sub-tracks and said write sub-heads and which are spaced apart from one another at a gap therebetween which is less than said narrow space between said sub-tracks, said read sub-heads and said write sub-heads being aligned relative to one another such that the gaps between the sub-heads are in alignment over a center of said narrow space between the sub-tracks when the sub-heads are positioned over the sub-tracks;

means for reading the information signal on the sub-tracks by combining outputs from both of the read sub-heads and outputting said information signal based on the combined outputs; and means for centering a middle of the gap between the two read sub-heads above a center of said narrow space between the sub-tracks by comparing read signals from each of the read sub-heads and moving the head relative to the two sub-tracks until the read signals are equal, the read signal from one of the read sub-heads increasing and the read signal from the other read sub-head decreasing as soon as the center of the gap between the read sub-heads is displaced from the center of the narrow space between the sub-tracks.

* * * * *